United States Patent Office 3,411,211
Patented Nov. 19, 1968

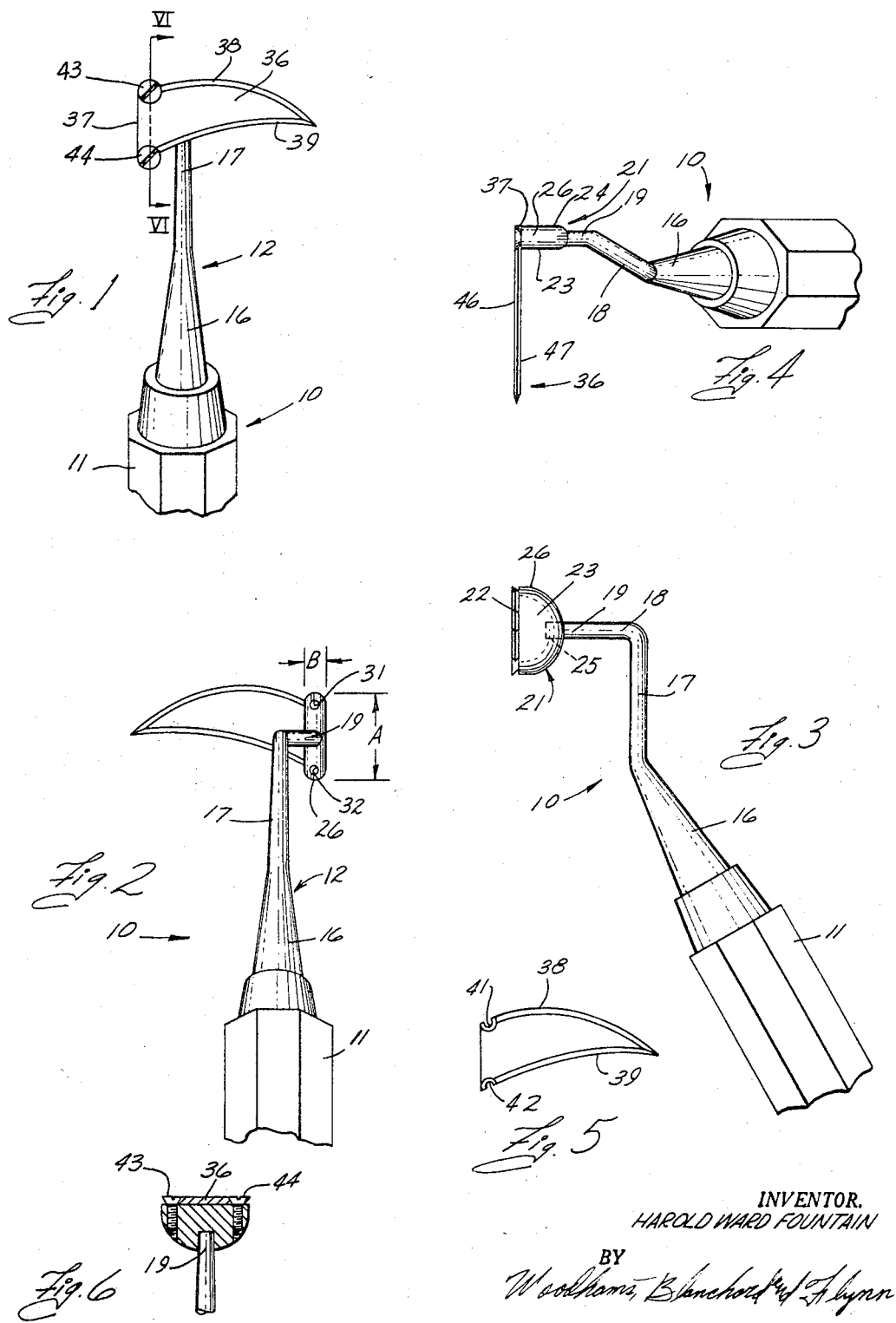

3,411,211
DENTAL TOOL
Harold Ward Fountain, 921 W. Kilgore Road, Portage Township, Kalamazoo County, Mich. 49081
Filed Sept. 28, 1965, Ser. No. 490,829
6 Claims. (Cl. 32—46)

ABSTRACT OF THE DISCLOSURE

A dental cutting tool having a handle and a shank extending therefrom. A mounting base is disposed at the end of the shank and a blade is removably mounted adjacent one end thereof on the mounting base. The mounting base is elongated in a direction transverse to the adjacent portion of the shank. The blade is preferably elongated in a direction transverse to both the mounting base and the shank and has cutting edges extending longitudinally thereof.

---

This invention relates to a dental tool and more particularly relates to a tool intended for cutting gum tissue adjacent to the teeth.

The present invention was developed to fulfill a need for a tool capable of cutting gum tissue adjacent to teeth, a primary instance of use being in pyorrhea cases.

Prior tools used for the purpose, of which I am aware, have not been completely satisfactory. Such prior tools generally include a slim elongated shank mounted at one end thereof on a manual engageable handle and having a knife edge formed on the other end thereof for cutting gum tissue. The intermediate portion of the shank is normally bent at several places to provide the desired location and orientation of the knife edge with respect to the handle. The existing tool has a primary disadvantage in that when the knife portion becomes dull, the entire tool is put out of use until such time as the cutting edge can be reground. Since the regrinding of the cutting edges would be a difficult operation to perform in the doctor's office, renewal of the cutting edges generally requires that the tool be sent to an outside agency for sharpening. As a result, the doctor must normally purchase and maintain several such tools so that at least one will be available in working condition at all times. Tools of this type are generally relatively expensive and it is undesirable that this expense be multiplied by the necessity of purchasing several such tools.

In the past, the afore-mentioned disadvantage, if recognized, apparently has been sublimated to the difficult task of meeting a variety of necessary and demanding requirements for a tool of this general type. One particularly rigorous requirement is that the tool be capable of effective use in a wide variety of positions and locations within the patient's mouth in order that gum tissue in front of or behind any of the patient's teeth may be cut away without interference between cutting edges or other portions of the tool with gum or other tissue or teeth in the patient's mouth.

Hence, the objects of this invention include:

(1) To provide an improved dental tool for cutting gum tissue adjacent teeth and which will be particularly useful in cases of pyorrhea.

(2) To provide a tool, as aforesaid, which includes a blade removably mounted on the shank of the tool, in which the cutting edge of the blade may be sharpened without requiring the presence of the entire tool and in which the blade may be made from material different from that of the shank and handle.

(3) To provide a tool, as aforesaid, in which the blade may be removed from the shank of the tool quickly and easily by the use of a single widely available and readily understood hand tool as by the doctor or an assistant in the doctor's office.

(4) To provide a tool, as aforesaid, in which a number of interchangeable blades can be used serially with a single tool shank and handle, in which the doctor need purchase and retain only one tool shank and handle plus several blades to provide the same effect as previously required the purchase and maintenance of several entire tools of the prior type, which can be made at a cost substantially competitive with prior one-piece tools and in which additional blades can be made at a cost substantially below the cost of prior one-piece tools.

(5) To provide a tool, as aforesaid, in which the blade is rigidly mountable on the end of the shank, in which the mounting of the blade on the tool shank is sufficiently strong as to easily withstand normal forces exerted thereon in use, and in which the means by which the blade is mounted upon a neck in no way interferes with the normal use of the tool for its intended purpose.

(6) To provide a tool, as aforesaid, in which the positions of the blade and shank are substantially similar to those of prior-known, one-piece tools and in which the operating characteristics and "feel" are substantially similar to those of prior one-piece tools so that doctors accustomed to prior tools will be able to use the present tool without difficulty.

(7) To provide a tool, as aforesaid, in which the means mounting the blade on the end of the shank are elongated in the normal direction of cutting motion and force and in which the blade is gripped at relatively widely spaced points along this direction to insure rigidity of mounting.

(8) To provide a tool, as aforesaid, which is readily sterilized and maintainable in a sterilized condition.

Other objects and purposes of the present invention will be apparent to persons acquainted with apparatus of this general type upon reading the following specification and inspecting the accompanying drawings.

In the drawings:

FIGURE 1 is a fragmentary elevational view of the tool showing the front face of the blade.

FIGURE 2 is a fragmentary elevational view of the tool showing the back face of the blade.

FIGURE 3 is a fragmentary elevational view taken from the right side of FIGURE 1.

FIGURE 4 is a fragmentary top elevational view.

FIGURE 5 is a front elevational view of the blade.

FIGURE 6 is a sectional view substantially taken on the line VI—VI of FIGURE 1.

General description

In general, the objects and purposes of this invention are met by providing a dental tool having a handle and a shank extending therefrom. A mounting base is disposed at the end of the shank and a blade is removably mounted adjacent one end thereof on the mounting base. The mounting base is elongated in a direction transverse to the adjacent portion of the shank. The blade is elongated in a direction transverse to both the base and the shank and has cutting edges extending longitudinally thereof.

Detailed description

The dental tool 10 (FIGURES 1–4) includes a manually engageable handle 11. A shank 12 extends from the handle 11 to which it is rigidly affixed by any convenient means not shown.

The shank 12 may be of any desired configuration. In the preferred embodiment shown, however, the shank includes a tapered portion 16 which substantially coaxially extends from the handle 11. The shank 12 further includes an intermediate portion 17, here of circular, substantially constant cross section, which extends from the tapered portion 16. In the particular embodiment shown, the intermediate portion 17 is spaced away from the axis of the tapered portion 16 and handle 11 at a relatively small acute angle, for example, about 30°.

The shank 12 includes a further portion 18 which is bent at right angles to the intermediate portion 17. The further portion 18 extends away from the handle 11 and diverges at a small acute angle, here about 30°, away from the plane of the axes of the portions 16 and 17.

Finally, the shank 12 includes an end portion 19 extending from the further portion 18. The end portion 19 is relatively short compared to the portion 18 preceding it and is bent away from the axis of the portion 18 at an angle of about 30° thereto. The end portion 19 and further portion 18 here define a plane perpendicular to the intermediate portion 17. The portion 19 is here parallel to and sidewardly displaced from the plane defined by the axes of the tapered portion 16 and intermediate portion 17.

The tool 10 includes a mounting base 21. The mounting base 21 is provided with a preferably planar forward wall or mounting surface 22 (FIGURES 3 and 4), a spaced parallel pair of side walls 23 and 24 and a peripheral edge wall 26 located between the side walls 23 and 24 and extending from the ends of the mounting surface 22. The peripheral edge wall 26 preferably follows a smoothly curved, preferably hemicircular path between the ends of the mounting surface 22. The peripheral edge wall 26 is preferably smoothly and continuously rounded into the side walls 23 and 24.

The mounting base 21 is rigidly secured to the end portion 19 of the shank 12 by any convenient means and may be integral therewith. In the particular embodiment shown, the end portion 19 is snugly received and soldered within a suitable blind hole 25 in the middle of the peripheral edge wall 26, the mounting surface 22 preferably lying at right angles to the axis of the end portion 19.

The mounting base 21 is elongated in the plane of the mounting surface 22 as indicated by the dimension A in FIGURE 2. The direction of such elongation is here parallel to the axis of the intermediate portion 17. The mounting base 21 is narrowest across the width of the mounting surface 22 as indicated at B in FIGURE 2, the dimension B being defined between the parallel side walls 23 and 24.

A pair of threaded holes 31 and 32 (FIGURES 2 and 6) extend from the mounting surface 22 adjacent the ends thereof rearwardly and preferably through the mounting base 21.

The tool 10 includes a removable blade 36 (FIGURES 1–5). The blade 36 is preferably formed of a flat piece of hardened steel or similar material capable of holding a sharp cutting edge. The blade 36 is, in the present embodiment, shown generally triangularly shaped, having a substantially straight base edge 37 and an elongated pair of cutting edges 38 and 39. The cutting edges 38 and 39 are preferably convexly and concavely curved respectively with the latter cutting edge being disposed closest to the handle 11.

The edges 38 and 39 adjacent the base edge 37 are preferably provided with semicircular, countersunk notches 41 and 42. Suitable fastening means, preferably flat headed machine screws 43 and 44, are used to mount the blade 36 on the mounting surface 22. More particularly, the machine screws 43 and 44 (FIGURES 1 and 2) extend through the notches 41 and 42, respectively, and then are threaded into the holes 31 and 32 in the mounting base 21. When tightened, the heads of the screws 43 and 44 are snugly received in the countersunk notches 41 and 42, the tops of said heads preferably being coplanar with the outer surface 46 (FIGURE 4) of the blade 36. The screws 43 and 44 urge the back surface 47 of the blade 36 snugly against the mounting surface 22 of the mounting base 21. With the blade 36 so affixed to the mounting base 21, the peripheries of the heads of the screws 43 and 44 are preferably coplanar with the adjacent portions of the rounded peripheral edge 26 and the base edge 37 of the blade 36 is preferably coplanar with the side wall 24 of the mounting base 21.

*Operation*

Thus, in use, the tool 10 is gripped by the handle 11, the cutting edges 38 and 39 of the blade 36 being directed by the doctor to perform surgery on the gums adjacent the teeth of a patient.

In the event that the cutting edges 38 and 39 become dull with use, the screws 43 and 44 may be removed from the mounting base 21 with a screw driver, thus releasing the blade 36 therefrom. Installation of a blade on the mounting base 21 can be achieved by a reversal of the above steps, the screws 43 and 44 being tightened until the portion of the back face 47 of the blade 36 opposite the mounting surface 22 is secured tightly thereagainst.

When the completed tool 10 is in use, the greatest forces are usually exerted on the blade 36 in a direction within the plane of the blade 36 and transverse of the cutting edges 38 and 39 and, thus, in a direction substantially parallel to the direction of elongation A of the mounting surface 22, i.e., along the line of centers of the screws 43 and 44. Such forces would tend to shift or rock the blade 36 within its own plane on the mounting base 21. The relatively wide spacing of the notches 41 and 42 and screws 43 and 44 and the elongation of the surface 22 all in a direction parallel to such forces firmly prevents any tendency of the blade 36 to shift or rock within its own plane in response to such forces.

In use, forces on the blade transverse to its plane will normally be lighter than forces exerted thereon within its plane. Moreover, forces transverse to the plane of the blade which might result in a rocking of the tip of the blade transversely of the plane of the surface 22 may be partially absorbed by flexing of the blade, the mounting of the blade on the base 21 being sufficiently strong as to withstand forces of this kind of magnitude well beyond that expected in normal use of the tool 10. Moreover, any tendency for forces transverse to the plane of the blade to rock same across the width dimension thereof, i.e., between the edges 38 and 39 will be strongly resisted by the relatively great spacing of the screws 43 and 44 and extent of the surface 22 in such direction.

Although providing a rigid attachment for the blade 36 on the shank 12, it will be noted that the mounting base 21 and screws 43 and 44 in no way interfere with use of the tool. More particularly, it will be noted that no portion of the tool extends transversely beyond the outer surface 46 of the blade 36. Thus, the outer surface 46 of the blade can be moved toward a portion of gum to be cut along the teeth in close and substantially parallel relationship without interference between such teeth and other portions of tool 10. Similarly, the outer edges of the screw heads do not extend beyond the edges of the mounting surface 22 and hence are shielded thereby to minimize any tendency of the screw head edges to accidentally injure the patient. Moreover, the blade 36 is cantilevered from the mounting base 21 in a manner that almost the entire inner or rearward surface 47 of the blade is widely spaced from the remainder of the tool 10 with the exception of the relatively narrow portion thereof along the base edge 37 which contacts the relatively narrow mounting surface 22. Further, the mounting base 21 is free of any sharp edges which might unintentionally be brought to bear against or be moved along portions of the patient's mouth. By minimizing the thickness dimension B as well as maximum distance between the surface 22 and the peripheral edge 26 unintended interference thereof with portions of the patient's mouth which might hamper the use of the blade 36 is minimized.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed is defined as follows:

1. In a dental tool, the combination comprising:
   a handle and a shank extending therefrom;
   a mounting base at the end of said shank, said mounting base comprising a substantially hemicircular member having a diametral wall, said shank being connected to the periphery of said mounting base and extending away therefrom at a location opposite said diametral wall, said mounting base further including a pair of substantially planar and closely spaced side walls extending between said diametral wall and said shank; and
   a blade removably mounted adjacent one end thereof on said diametral wall, said blade, mounting base and shank being elongating transversely of each other.

2. In a dental tool, the combination comprising:
   a handle and a shank extending therefrom;
   a mounting base at the end of said shank, said mounting base having a wall on the side thereof opposite said shank with said wall comprising an elongated mounting surface;
   a blade adapted to be removably mounted on the wall of said base opposite said shank, said blade including a base edge located adjacent said mounting surface;
   mounting means disposed adjacent the ends of said elongated mounting surface for gripping said blade and fastening same rigidly against said mounting surface; and
   said blade, mounting base and shank being elongated transversely of each other.

3. The device defined in claim 2 in which the blade is substantially triangularly shaped, is flattened, has a base edge corresponding generally to the length of said mounting base, is elongated in a direction away from said mounting base edge and has at least one cutting edge extending along the length thereof.

4. The device defined in claim 2 in which a pair of notches are provided in said blade on opposite sides thereof and adjacent said base edge, the sides of said notches being sloped in a countersunk manner, said mounting means comprise a pair of flat headed screws and said mounting base is provided with a pair of threaded openings located adjacent the ends of said elongated mounting surface for receiving said screws thereinto, the heads of said screws engaging said countersunk notches when tightened firmly for holding said blade against said elongated mounting surface.

5. The device defined in claim 4 in which said mounting surface is rounded adjacent the ends thereof, the heads of said screws are aligned with such rounded ends and said base edge is coplanar with the adjacent side wall of said mounting base.

6. In a dental tool, the combination comprising:
   a handle and a shank extending therefrom;
   a mounting base at the end of said shank, said mounting base having a wall thereon defining a mounting surface having an elongated direction extending transversely to said shank;
   a blade positioned adjacent said mounting surface and adapted to be removably secured to said mounting base, said blade being elongated in a direction transversely of said shank; and
   mounting means interconnecting said blade and said mounting base for positioning said blade rigidly against said mounting surface.

References Cited

UNITED STATES PATENTS

| | | |
|---|---|---|
| 788,909 | 5/1905 | Ivory. |
| 3,325,900 | 6/1967 | Sohlberg _____ 32—46 |

LOUIS G. MANCENE, *Primary Examiner.*

CHARLES R. WENTZEL, *Assistant Examiner.*